US 12,121,046 B2

(12) United States Patent
Baudouin et al.

(10) Patent No.: US 12,121,046 B2
(45) Date of Patent: Oct. 22, 2024

(54) SYSTEMS AND METHODS FOR DEACIDIFICATION OF FLUIDS

(71) Applicant: WEST INVEST SA, Luxembourg (LU)

(72) Inventors: Stanislas Baudouin, Perigny (FR); Eric Reynaud, Luxembourg (LU)

(73) Assignee: WEST INVEST SA, Luxembourg (LU)

(*) Notice: Subject to any disclaimer, the term of this patent is extended or adjusted under 35 U.S.C. 154(b) by 589 days.

(21) Appl. No.: 17/269,683

(22) PCT Filed: May 22, 2019

(86) PCT No.: PCT/IB2019/054236
§ 371 (c)(1),
(2) Date: Feb. 19, 2021

(87) PCT Pub. No.: WO2020/039271
PCT Pub. Date: Feb. 27, 2020

(65) Prior Publication Data
US 2021/0212345 A1    Jul. 15, 2021

Related U.S. Application Data

(60) Provisional application No. 62/722,529, filed on Aug. 24, 2018, provisional application No. 62/744,317, filed on Oct. 11, 2018.

(51) Int. Cl.
*A23L 2/78* (2006.01)
*B01J 41/00* (2006.01)
(Continued)

(52) U.S. Cl.
CPC ............... *A23L 2/78* (2013.01); *B01J 41/00* (2013.01); *B01J 41/12* (2013.01); *B01J 47/15* (2017.01); *B01J 49/07* (2017.01)

(58) Field of Classification Search
CPC .... A23L 2/78; B01J 41/00; B01J 41/12; B01J 47/15; B01J 49/07
(Continued)

(56) References Cited

U.S. PATENT DOCUMENTS 4,522,836 A     6/1985  Dechow et al.
2004/0197448 A1  10/2004  Chung et al.
(Continued)

FOREIGN PATENT DOCUMENTS

FR     3056080 A1    3/2018
WO   2012008830 A1    1/2012
WO   2020039271 A1    2/2020

OTHER PUBLICATIONS

International Search Report and Written Opinion for International Application PCT/IB2019/054236; International Filing Date: May 22, 2019; Date of Mailing: Oct. 8, 2019; 9 pages.
(Continued)

*Primary Examiner* — Fred Prince
(74) *Attorney, Agent, or Firm* — CANTOR COLBURN LLP (57) ABSTRACT

Provided herein are methods, systems, and computer-readable media for controlling a deacidification process for an aqueous fluid circulated through a deacidification column. A first pH value, indicative of a pH of the fluid before circulation through the column, is obtained from a first sensor located at an entry of the column. A second pH value, indicative of a pH of the fluid after circulation through the column, is obtained from a second sensor located at an exit of the column. The second pH value is compared to a target pH value for the fluid to determine a pH difference between the second pH value and the target pH value. Based on the first and second pH values, a deacidification capacity of the column is determined. A fluid flow rate of the fluid through
(Continued)

the column is adjusted based on the pH difference and the deacidification capacity.

13 Claims, 4 Drawing Sheets

(51) Int. Cl.
    *B01J 41/12*     (2017.01)
    *B01J 47/15*     (2017.01)
    *B01J 49/07*     (2017.01)

(58) Field of Classification Search
    USPC ......... 210/600, 660, 661, 670, 669; 426/271
    See application file for complete search history.

(56) References Cited

U.S. PATENT DOCUMENTS

2011/0165310 A1     7/2011     Blase et al.
2019/0216112 A1*   7/2019     Reynaud ................ A61K 36/45
2023/0320386 A1     10/2023   Reynaud et al.

OTHER PUBLICATIONS

Zhao, H. et al.; "Study on deacidification process of blackberry juice"; International Society for Horitcultural Science, Article 1117_38; 2016; pp. 237-244; DOI: 10.17660/ACTAHORTIC.201631117.38.

ANONYMOUS; "Chemistry of ascorbic acid" [Wikipedia article] available online at "https://en.wikipedia.org/wiki/Chemistry_of_ascorbic_acid" (Retrieved Feb. 24, 2023); 2023; 9 pages.

International Search Report and Written Opinion for International Application PCT/IB2021/057959; International Filing Date: Aug. 31, 2021; Date of Mailing: Jan. 24, 2022; 18 pages.

* cited by examiner

SYSTEMS AND METHODS FOR DEACIDIFICATION OF FLUIDS

CROSS REFERENCE TO RELATED APPLICATIONS

This application is a National Stage application of PCT/IB2019/054236, filed May 22, 2019, which claims the benefit of priority of U.S. Provisional Patent Application No. 62/722,529, filed Aug. 24, 2018 and U.S. Provisional Patent Application No. 62/744,317, filed Oct. 11, 2018, all of which are incorporated by reference in their entirety herein.

TECHNICAL FIELD

The present disclosure relates generally to fluid treatment techniques, and more specifically to aqueous fluid deacidification.

BACKGROUND

Many beverages, including many fruit juices, are subjected to a deacidification process before they are sold or otherwise provided for consumption. Since most consumers do not react positively to highly acidic beverages, the deacidification process renders the resulting product more palatable to consumers. Typical deacidification process functions by stripping away acidic molecules found in the juice. This is done by circulating the juice in a column containing polymer beads (called ion exchange resin) that capture the acidic molecules.

These processes are conducted at a fixed and generally low flow rate of the juice in the column. As the juice passes through the column, extended contact time between the juice and the polymer beads in the column cause acidic molecules to be captured substantially indiscriminately from the juice. However, certain acidic molecules may have beneficial properties, and their removal from the juice may be undesirable. In addition, traditional approaches to deacidification can cause the juice to become excessively basic, which can result in unwanted changes in juice characteristics.

As a result, there is room for improvement.

SUMMARY

In accordance with a broad aspect, there is provided a method of controlling a deacidification process for an aqueous fluid circulated through a deacidification column, comprising: obtaining, from a first sensor located at an entry of the column, a first pH value indicative of a pH of the fluid before circulation through the column; obtaining, from a second sensor located at an exit of the column, a second pH value indicative of a pH of the fluid after circulation through the column; comparing the second pH value to a target pH value for the fluid to determine a pH difference between the second pH value and the target pH value; determining, based on the first and second pH values, a deacidification capacity of the column; and adjusting a fluid flow rate of the fluid through the column based on the pH difference and the deacidification capacity.

In accordance with another broad aspect, there is provided a system for controlling a deacidification process for an aqueous fluid circulated through a deacidification column, comprising: a flow control in fluid communication with the column and configured for adjusting the fluid flow rate of the fluid through the column; a first sensor located at an entry to the column, the first sensor configured for obtaining a first pH value indicative of a pH of the fluid before circulation through the column; a second sensor located at an exit of the column, the second sensor configured for obtaining a second pH value indicative of a pH of the fluid after circulation through the column; and a controller communicatively coupled to the first and second sensor for receiving therefrom the first and second pH values, the controller configured for: comparing the second pH value to a target pH value for the fluid to determine a pH difference between the second pH value and the target pH value; determining, based on the first and second pH values, a deacidification capacity of the column; adjusting, via the flow control, a fluid flow rate of the fluid through the column based on the pH difference and the deacidification capacity.

In accordance with a further broad aspect, there is provided a non-transitory computer-readable medium having stored thereon instructions which, when executed by a processing unit of a computing device, cause the computing device to perform operations comprising: obtaining, from a first sensor located at an entry of a deacidification column, a first pH value indicative of a pH of an aqueous fluid before circulation through the column; obtaining, from a second sensor located at an exit of the column, a second pH value indicative of a pH of the fluid after circulation through the column; comparing the second pH value to a target pH value for the fluid to determine a pH difference between the second pH value and the target pH value; determining, based on the first and second pH values, a deacidification capacity of the column; and adjusting a fluid flow rate of the fluid through the column based on the pH difference and the deacidification capacity.

BRIEF DESCRIPTION OF THE DRAWINGS

The invention will be described in greater detail with reference to the accompanying drawings, in which.

It will be noted that throughout the appended drawings, like features are identified by like reference numerals.

DETAILED DESCRIPTION

Fluid deacidification is often performed on beverages and other aqueous fluids for consumption, for instance to make the fluid more palatable to a consumer. Many traditional approaches make use of a cylindrical basin or other reservoir (sometimes called "column") filled with polymer beads (sometimes called "ion exchange resin") which serve to capture acidic molecules in the aqueous fluid. For deacidification processes, the ion exchange resin used is an anion exchange resin. The aqueous fluid is circulated through the column such that the beverage comes into contact with the resin, causing the resin to strip away acidic molecules from the aqueous fluid. In some cases, the aqueous fluid contains particular molecules which are removed by the resin in substantially as a whole; in other cases, the resin serves to strip portions of molecules which cause acidic properties.

Although the present disclosure focuses primarily on applications for beverages fit for consumption, such as juices and extracts, it should be noted that the techniques and approaches described herein can be applied to numerous other types of aqueous fluids, including various aqueous solutions containing organic molecules, and the like. In some embodiments in which the fluid is a fruit juice or similar beverage, the fruit juice may comprise at least one of an organic carboxylic acid, or one or more polyphenols, one or more proanthocyanidins, or any other suitable natural molecule.

In one embodiment the aqueous fluid/beverage is a fruit juice, including cranberry juice, pomegranate juice, pineapple juice, Camerise (Family: Honeysuckle), Pomegranate (*Malum granatum*), Blackcurrant (Family: Grossulariaceae), Redcurrant (Family: Grossulariaceae; *Ribes rubrum*, *Ribes uva-crispa*, and *Ribes nigrum*), Blueberry (*Vaccinum* and *Myrtillus*), Blackberry (*Meuron* and *Rubus*), Strawberry (*Fragaria*; Family: Rosaceae; *Fragaria vesca*, and *Fragaria virginiana*), Raspberry (*Rubus idaeus*), Acai (*Euterpe oleracea*), Acerola (Caraïbe cherry), Goji berry (*Lycium barbarum* or *chinense*; Family: Solanaceae), Cynorhodon (fruit of Eglantier), *Arbutus* (*Arbutus unedo*; Family: Ericaceae), Myrtle (*Myrtus communis*; Family: Myrtaceae), Guarana (*Paullinia cupana*), Coffee berry (Coffee tree), Cola nuts (Colatier, *Cola nitida*, and *Acuminata*; Family: Sterculiaceae), and the like.

Figure 1:
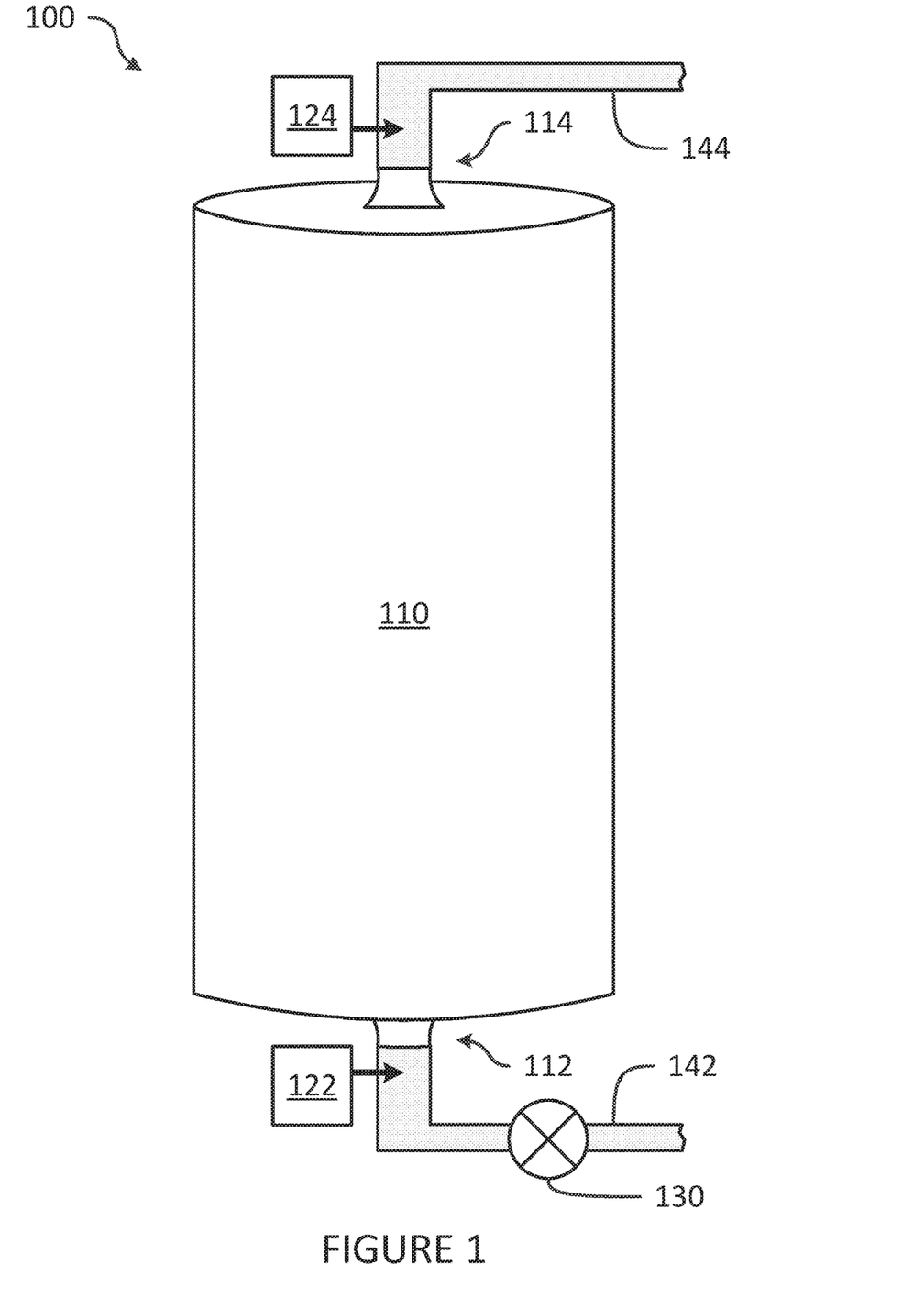
FIG. 1 is a schematic view of an example deacidification module.

With reference to FIG. 1, there is shown an example deacidification module 100. The deacidification module 100 is composed of a deacidification column 110, a pair of pH sensors 122, 124, a flow control 130, and fluid conduits 142, 144. The deacidification column 110 is in fluid communication with the fluid conduits 142, 144: for example, fluid flowing through the fluid conduit 142 can enter the deacidification column 110 at an entry point thereof, illustrated here as entry 112, which is proximate the pH sensor 122. The fluid then traverses the deacidification column 110, and exits the deacidification column 110 at an exit point thereof, illustrated here as exit 114, which is proximate the pH sensor 124, and then flows through the fluid conduit 144.

The deacidification column 110 serves to receive a beverage or other aqueous fluid for deacidification, for instance as provided via the fluid conduit 142. The deacidification column 110 contains therein a material suitable for performing deacidification of the aqueous fluid, for instance the aforementioned ion exchange resin. The resin can be disposed within the deacidification column 110 in any suitable fashion: in some embodiments, the deacidification column 110 is substantially filled with the resin, and in other embodiments the resin is disposed in a particular formation for guiding the flow of the aqueous fluid through the deacidification column 110. Still other embodiments are considered.

Over time, as the ion exchange resin in said deacidification column 110 is exposed to a larger cumulative volume of aqueous fluid for deacidification, the exchange process by which the ion exchange resin deacidifies aqueous fluids causes the resin to become less efficient, and the deacidification capacity can become reduced. In some embodiments, once the deacidification capacity of the deacidification column 110 falls below a predetermined value, the deacidification column 110 can be removed from a deacidification production system and the ion exchange resin is "regenerated", for instance via exposure to a regenerating solution. In other embodiments, the ion exchange resin within the deacidification column 110 can be removed and replaced with fresh resin. Still other embodiments are considered. In further embodiments, a fluid flow path for the aqueous fluid can be redirected to secondary or alternate deacidification column(s) once the deacidification capacity is below a certain level.

Although the deacidification column 110 is illustrated here as being cylindrical in shape, it should be noted that the deacidification column 110 can take on any suitable shape and size, as appropriate. In some embodiments, the deacidification column 110 is composed of a plurality of deacidification stages, and which can be substituted for one another as appropriate, for instance when one stage of the deacidification column 110 requires regeneration.

Although the deacidification column 110 is illustrated here with fluid conduit 142 at the bottom of the drawing and fluid conduit 144 at the top of the drawing, the operation of the deacidification column 110 can be in a bottom-up or top-down flow direction. Thus, the deacidification column 110 can be used in an upflow configuration or in a downflow configuration, as is appropriate for the particular use case of the deacidification column 110.

The pH sensors 122, 124 are located proximate the entry 112 and exit 114 of the deacidification column 110, respectively, and are configured for measuring the pH of the aqueous fluid prior to entry 112 into the deacidification column 110, and following exit 114 from the deacidification column 110, respectively. The pH sensors 122, 124 can be substantially similar to one another, and can be implemented using any suitable pH measuring technology. In some embodiments, the pH sensors 122, 124 are configured for measuring the pH of the aqueous fluid substantially in real time. In other embodiments, the pH sensors 122, 124 are configured to measure the pH of the aqueous fluid periodically, punctually, for instance in response to a request for a pH measurement, or according to any other suitable sampling technique. As discussed in greater detail hereinbelow, the pH sensors 122, 124 are configured for providing pH values to a controller or other control system. The pH values can be provided substantially in real time, periodically, punctually, or in any other suitable fashion.

It should be noted that although the present discussion focuses on embodiments in which the deacidification module 100 has two pH sensors 122, 124, embodiments with additional pH sensor are also considered. In some embodiments, additional pH sensors can be placed at the entry 112 and/or at the exit 114 of the deacidification column 110, for instance to provide redundancy for the pH measurement. In some other embodiments, one or more pH sensors can be placed within the deacidification column 110, for instance to measure the pH of the aqueous fluid at one or more locations within the deacidification column 110. Other embodiments are also considered.

The flow control 130 is configured for controlling the flow of the aqueous fluid into the deacidification column 110. The flow control 130 can be adjusted to alter the rate of flow of the aqueous fluid along a continuum, or can set the rate of flow to one of a plurality of preset flow values. The flow control 130 can be a valve of any suitable type, including hydraulic valves, pneumatic valves, solenoid valves, motor-driven valves, and the like. Other flow control devices can also be used, for instance one or more pumps. In some embodiments, the flow control 130 is configured for being electronically controlled via a controller or other control system. For example, the flow control 130 includes a motor which can be controlled electronically in response to instructions from the controller. Still other embodiments are considered. In some instances, the flow control 130 is configured for controlling the flow of the aqueous fluid at a value between 10 and 300 bed volumes per hour (BV/h), between 15 and 200 BV/h, between 20 and 150 BV/h, between 30 and 120 BV/h, or between any other suitable ranges of fluid flow rates.

It should be noted that the particular position of the flow control 130 shown in FIG. 1 is one example, and that others are considered. In some examples, the flow control 130 could be located at any suitable location along the fluid conduit 142. In some other examples, the flow control 130 is located at any suitable location along the fluid conduit 144. Still other examples are considered. Moreover, in some embodiments, the deacidification module 100 omits the flow control 130, and control of the flow of aqueous fluid to the deacidification column 110 can be performed by a device or system external to the deacidification module 100.

The fluid conduits 142, 144 can be any suitable type of conduit for directing the circulation of the aqueous fluid, for example any suitable type of piping. The fluid conduit 142 is configured for carrying the aqueous fluid to the deacidification column 110, and the fluid conduit 144 is configured for carrying the aqueous fluid away from the deacidification column 110. In some embodiments, a pump or similar device can be used to facilitate the circulation of the aqueous fluid through the fluid conduits 142, 144.

Figure 2:
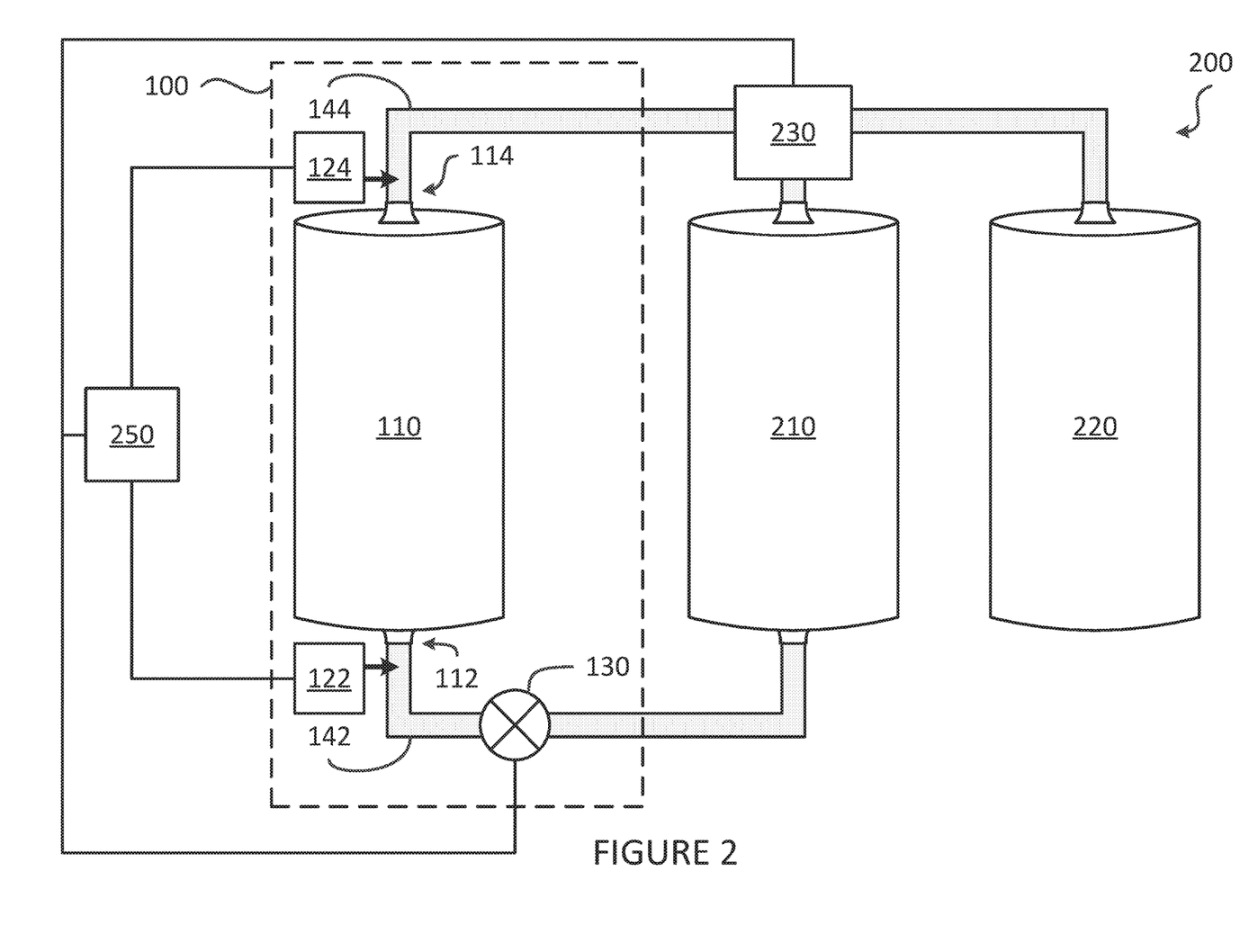
FIG. 2 is a schematic view of an example deacidification system using the deacidification module of FIG. 1.

With reference to FIG. 2, the deacidification module 100 can be used as part of a deacidification system 200 for deacidifiying an aqueous fluid, for instance a beverage. The deacidification system 200 comprises a supply reservoir 210, a product reservoir 220, a flow directional control 230, a controller 250, and the deacidification module 100.

As part of the deacidification system 200, the deacidification module 100 is in fluid communication with the supply reservoir 210 and the product reservoir 220, via the flow control 130 and/or via the flow directional control 230. The deacidification column 110 is provided with an aqueous fluid for deacidification from the supply reservoir 210, and after being circulated through the deacidification column 110, the deacidified aqueous fluid can be circulated to the supply reservoir 210 or to the product reservoir 220, as appropriate. For example, if, after being circulated through the deacidification column 110, the aqueous fluid is sufficiently deacidified, the aqueous fluid can be circulated to the product reservoir 220. Alternatively, if, after being circulated through the deacidification column 110, the aqueous fluid is not yet sufficiently deacidified, the aqueous fluid can be recirculated to the supply reservoir 210 for further deacidification by the deacidification module 100. To determine whether the aqueous fluid has been sufficiently deacidified, pH values from the pH sensor 124 can be compared against a target pH value for the aqueous fluid, as discussed in greater detail hereinbelow.

The supply reservoir 210 can be any suitable container for receiving and storing aqueous fluid to be deacidified. In some embodiments, the supply reservoir 210 is provided with one or more pumps for causing circulation of the aqueous fluid from the supply reservoir 210 to the deacidification column 110. In other embodiments, the flow control 130 is configured for causing circulation of the aqueous fluid from the supply reservoir 210 to the deacidification column 110. In addition, the supply reservoir 210 includes an inlet or other entry point for receiving aqueous fluid to be deacidified from an outside source, for instance a production process. Although illustrated here as a single supply reservoir, it should be noted that the deacidification system 200 can include any suitable number of supply reservoirs.

The product reservoir 220 can be any suitable container, and can be similar to or different from the supply reservoir 210. The product reservoir is configured for storing aqueous fluid which has been sufficiently deacidified for part or all of the deacidification process. Deacidified aqueous fluid can be circulated to the product reservoir via the flow directional control 230, for instance from the deacidification column 110. Although illustrated here as a single product reservoir, it should be noted that the deacidification system 200 can include any suitable number of product reservoirs.

The flow directional control 230 is configured for selectively routing aqueous fluid exiting the deacidification module 100 to one of the supply reservoir 210 and the product reservoir 220, for example based on the pH value of the aqueous fluid at the exit 114 of the deacidification module 100. The flow directional control 230 can be implemented by way of a three-way valve or other suitable device. In some embodiments, operation of the flow directional control 230 can be controlled by way of the controller 250, as detailed hereinbelow.

In operation, the deacidification module 100 receives aqueous fluid to be deacidified from the supply reservoir 210 via the fluid conduit 142, and deacidification of the aqueous fluid is performed by circulating the aqueous fluid through the deacidification column 110. Upon exiting the deacidification column 110, the deacidified aqueous fluid is circulated to the flow directional control 230 via the fluid conduit 144. Based on the pH value of the aqueous fluid at the exit 114 of the deacidification column 110, the flow directional control 230 can cause the aqueous fluid to be circulated to the supply reservoir 210 or to the product reservoir 220.

The controller 250 is configured for controlling operation of the various components of the deacidification system 200, including the flow control 130 and the flow directional control 230. The controller 250 is communicatively coupled to the pH sensors 122, 124, to the flow control 130, and to the flow directional control 230, using any suitable wired or wireless technologies. For example, wired connections may use one or more of RS-232, Serial ATA, USB™ (any version), Ethernet, Lightning™, and the like. Wireless connections may use any suitable protocols, such as WiFi™ (e.g. 802.11a/b/g/n/ac), Bluetooth™, Zigbee™, various cellular protocols (e.g. EDGE, HSPA, HSPA+, LTE, etc.) and the like. The controller 250 can be implemented using any suitable computing platform, including generic computers, for example Raspberry Pi™ or similar devices, microcontrollers, for example Arduino™ or similar devices, field-programmable grid arrays (FPGAs), application-specific integrated circuits (ASICs), and the like.

The controller 250, being coupled to the pH sensor 122, is configured for obtaining pH values therefrom which are indicative of a pH of the aqueous fluid before circulation through the deacidification column 110 (hereinafter "first pH values"). Similarly, the controller 250 is configured for obtaining pH values from the pH sensor 124 which are indicative of a pH of the aqueous fluid after circulation through the deacidification column 110 (hereinafter "second pH values"). Using the first and second pH values, the controller 250 can regulate the deacidification process performed by the deacidification module 100, for instance by controlling the operation of the flow control 130 and of the flow directional control 230.

As part of the deacidification process for beverages, the beverage is deacidified in order to produce a palatable and enjoyable beverage which is fit for consumption. The beverage can be deacidified until it reaches a particular pH level, referred to herein as a target pH value. Alternatively, or in addition, an allowable pH range, with upper and lower bounds, can be established, and the deacidification process can be repeated until the beverage has a pH value within the allowable pH range. In the case of aqueous fluids that are not beverages, or not otherwise processed for consumption, the deacidification process can be performed on the aqueous fluid so that the aqueous fluid reaches a particular target pH value, and in some embodiments, to ensure that the aqueous fluid never reaches a pH value outside a predetermined pH range.

The controller 250 is configured for comparing the second pH value, which is taken by the pH sensor 124 at the exit 114 of the deacidification column 110, to the target pH value to determine a pH difference between the second pH value and the target pH value. Depending on the value of the pH difference, the controller 250 can produce instructions for adjusting the fluid flow rate to the deacidification column 110. The controller 250 can then control the flow control 130 based on the instructions to adjust the fluid flow rate to the deacidification column 110. In some embodiments, the pH difference is defined as a function $f$ of the second pH value and the target pH, and the fluid flow rate $F_i$ can be defined as:

$$F_i = f\left(\frac{1}{pH_2 - pH_t}\right)$$

where $pH_2$ is the second pH value and $pH_t$ is the target pH value.

For example, if the pH difference is negative, i.e. the second pH value is below the target pH value, the fluid flow rate can be decreased, thereby increasing the amount of time the aqueous fluid spends in contact with the resin in the deacidification column 110. In another example, if the pH difference is positive, i.e. the second pH value is above the target pH value, the fluid flow rate can be increased, thereby decreasing the amount of time the aqueous fluid spends in contact with the resin in the deacidification column 110. Changes in the amount of contact time between the aqueous fluid and the resin in turn changes the rate of deacidification of the aqueous fluid, and control of the fluid flow rate can be used to produce a deacidified aqueous fluid having a pH close to or at the target pH value.

In some embodiments, the controller 250 is alternatively, or in addition, configured for comparing the second pH value to the upper bound and/or the lower bound of the allowable pH range. The controller 250 can determine a proximity of the second pH value to the upper bound and/or the lower bound, and the fluid flow rate can be adjusted based on the proximity. For example, the allowable pH range can be ±0.5 around the target pH value. When the second pH value is within 0.1, or 0.25, or any other suitable value, of the upper or lower bound of the allowable pH range, the controller 250 can instruct the flow control 130 to alter the fluid flow rate to maintain the second pH value within the allowable pH range. It should be noted that other allowable pH ranges, for example ±0.1, ±0.2, ±0.25, ±0.75, ±1.0, and any other suitable range, around the target pH value, are also considered.

In some embodiments, the pH difference and/or the proximity of the pH to the upper and/or lower bound can be monitored over a period of time to determine a rate of change of the pH difference and/or of the proximity of the pH to the upper and/or lower bound. The controller 250 can use the rate of change of the pH difference and/or the proximity to determine trends in the pH and/or the proximity, respectively. Using these trends, the controller 250 can project future values for the second pH value and pre-emptively adjust the fluid flow rate by instructing the flow control 130. In this fashion, the pH difference can be minimized and/or the second pH value can be kept within the allowable pH range. The determination of trends in the pH value, the proximity of the pH value to the upper and/or lower bounds, and the like, can be performed using any suitable computational techniques, include evaluating one or more derivatives, as appropriate.

In some further embodiments, the controller 250 is configured for determining a remaining "deacidification capacity" of the deacidification column 110. As used herein, the expression "deacidification capacity" refers to the amount of deacidification that can still be performed by the resin in deacidification column 110. The deacidification capacity can be expressed as a percentage of remaining capacity, for example on a scale relative to a regenerated or new ion exchange resin in deacidification column 110, in terms of an absolute amount of deacidification which can be performed, for instance in units of moles, or using any other suitable metric.

The deacidification capacity of the deacidification column 110 can be determined as a function of the first pH value, taken by the pH sensor 122 at the entry 112 to the deacidification column 110, and of the second pH value, taken by the pH sensor 124 at the exit 114 of the deacidification column 110. In some embodiments, the deacidification capacity $C_r$ is defined as a function $f$ of the second pH value and the target pH:

$$C_r = f(e^{-pH_2} - e^{-pH_1})$$

where $pH_2$ is the second pH value and $pH_1$ is the first pH value.

In some embodiments, the controller 250 is further configured for evaluating a rate of change of the deacidification capacity, for example by evaluating a first derivative of the deacidification capacity. The controller 250 can use the rate of change of the deacidification capacity to determine trends in the deacidification capacity $C_r$. Using these trends, the controller 250 can project future values for the deacidification capacity $C_r$, for example to determine a projected time or cumulative volume of aqueous fluid processed by which point the deacidification capacity $C_r$ will reach 0, or some lower bound. The controller 250 can pre-emptively raise an alert, for example for an operator of the deacidification system 200, indicating a projected time at which the ion exchange resin in deacidification column 110 will need to be regenerated or replaced, as appropriate.

In some embodiments, trends in the deacidification capacity can also be evaluated by the controller 250 to pre-emptively identify a need for maintenance for the deacidification module 100. For instance, if the rate of change of the deacidification capacity is below a predetermined minimum, or above a predetermined maximum, this can be indicative of some failure or malfunction of the deacidification column 110. In such cases, the controller 250 can raise an alert for an operator of the deacidification system 200 indicating the possibility of malfunction.

The controller 250 is thus configured for altering the fluid flow rate of the aqueous fluid through the deacidification column 110 based on one or more factors, including the pH difference between the second pH value and the target pH value, the proximity of the second pH value to the upper and/or lower bound of the allowable pH range, a rate of change of the pH difference and/or the proximity, the deacidification capacity of the deacidification column 110 and/or the rate of change of the deacidification column 110.

Still other factors, including "acceleration" functions of the pH difference, the proximity, and/or the deacidification capacity can also be used by the controller 250 to further adjust the fluid flow rate to the deacidification column 110.

The controller 250 is also configured for controlling operation of the flow directional control 230 to direct the circulation of the aqueous fluid exiting the deacidification column 110. The controller 250 can use the second pH value to determine whether the aqueous fluid is sufficiently deacidified, for example by comparing the second pH value to the target pH value and/or to the allowable pH range. When the pH of the aqueous fluid is within the allowable pH range, or sufficiently similar to the target pH value, the controller 250 can instruct the flow directional control 230 to cause the aqueous fluid exiting the deacidification column 110 to be circulated to the product reservoir 220. Conversely, when the pH of the aqueous fluid is below the allowable pH range, or insufficiently similar to the target pH value, the controller 250 can instruct the flow directional control 230 to cause the aqueous fluid exiting the deacidification column 110 to be circulated to the supply reservoir 210 for further deacidification.

In some embodiments, the controller 250 is configured to ensure that the pH of the aqueous fluid does not exceed a predetermined maximum pH value. For example, the aqueous fluid can be a juice containing particular valuable pH-sensitive molecules which can be damaged or destroyed if the pH of the juice exceeds a certain pH value. In one instance, the juice is a fruit juice, such as cranberry juice, pomegranate juice, or the like, which contains polyphenols, and proanthocyanidins, or similar molecules. In this instance, the maximum pH value can be any suitable value preventing degradation of those valuable molecules. Thus, the controller 250 can use the aforementioned factors for controlling the fluid flow rate via the flow control 130 to ensure that the pH of the juice does not exceed the maximum pH value.

Figure 3:
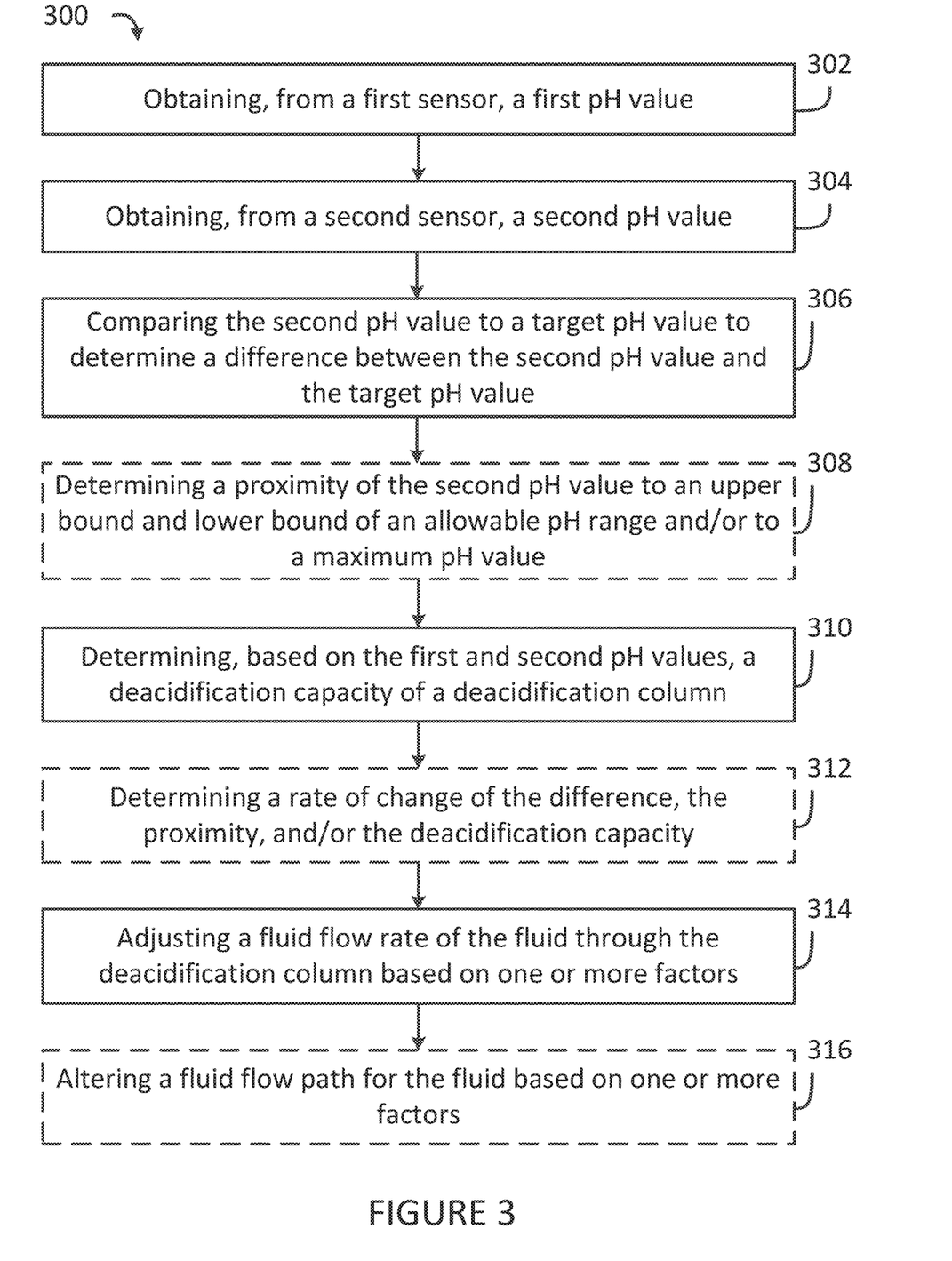
FIG. 3 is a flowchart illustrating a method of controlling a deacidification process for a fluid, in accordance with an embodiment.

With reference to FIG. 3, a method 300 of controlling a deacidification process for an aqueous fluid circulated through a deacidification column, for example the deacidification column 110, can be implemented, for example via the controller 250 of the deacidification system 200. At step 302, a first pH value is obtained from a first sensor, for example the pH sensor 122. The first pH value is indicative of the pH of a fluid at an entry point of a deacidification column, for example at the entry 112 of the deacidification column 110. At step 304, a second pH value is obtained from a second sensor, for example the pH sensor 124. The second pH value is indicative of the pH of the fluid at an exit point of the deacidification column 110, for example at the exit 114.

At step 306, the second pH value is compared to a target pH value to determine a difference between the second pH value and the target pH value. Optionally, at step 308, a proximity of the second pH value to an upper bound and/or a lower bound of an allowable pH range, or to a maximum pH value, can be determined.

At step 310, a deacidification capacity of the deacidification column 110 is determined based on the first and second pH values. Optionally, at step 312, a rate of change of the difference, the proximity, and/or the deacidification capacity can be determined.

In order to implement steps 306 to 312, the controller 250 can use any suitable algorithms and calculations, as appropriate. For example, to determine the rate of change of one or more of the factors, the controller 250 can use a differentiator, or a differentiation algorithm, as appropriate.

At step 314, the fluid flow rate of the fluid through the deacidification column 110 is adjusted based on one or more of the aforementioned factors. In some embodiments, the controller 250 generates instructions for a fluid control device, for instance the fluid control 130. The controller 250 can then transmit the instructions to the fluid control 130, which can, for example, adjust a valve position and/or a pump or other operating parameter of the fluid control 130 to effect the adjustment in the fluid flow rate of the fluid.

Optionally, at step 316, a fluid flow path for the aqueous fluid can be altered based on one or more of the factors. For example, the controller 250 can evaluate the second pH value to determine whether the aqueous fluid is sufficiently deacidified, and can selectively alter the fluid flow path for the fluid based thereon.

It should be noted that some or all of the steps of the method 300 can be omitted, repeated, or altered, as appropriate. The order in which the steps of the method 300 are presented can also be altered, as appropriate.

Figure 4:
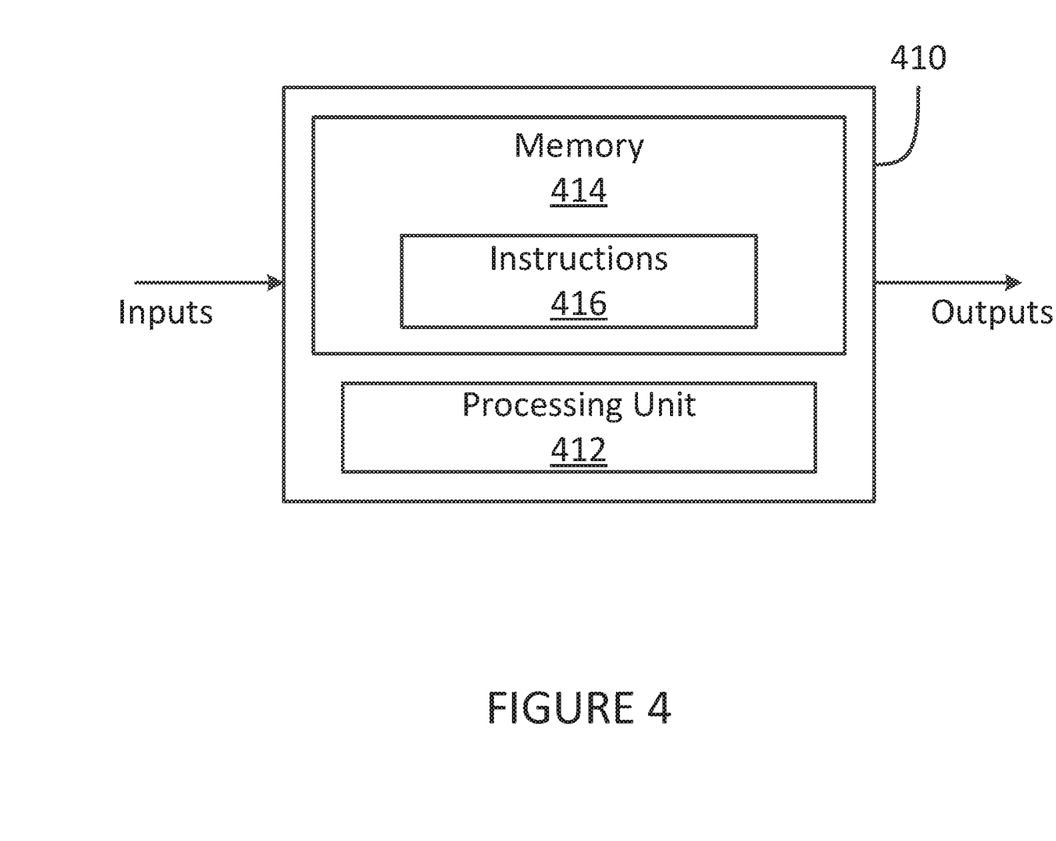
FIG. 4 is a block diagram illustrating an embodiment of a computing system for implementing the method of FIG. 4 in accordance with an embodiment described herein.

With reference to FIG. 4, the method 300 may be implemented by a computing device 410, comprising a processing unit 412 and a memory 414 which has stored therein computer-executable instructions 416. For example, the controller 250 can be embodied as the computing device 410.

The processing unit 412 may comprise any suitable devices configured to implement the method 300 such that instructions 416, when executed by the computing device 410 or other programmable apparatus, may cause the functionality of the control system 400 described herein to be implemented. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The methods for controlling a deacidification process for an aqueous fluid described herein may be implemented in a high level procedural or object-oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure and the foregoing examples.

In at least some first non-limiting examples, adjusting the fluid flow rate of the fluid comprises adjusting the fluid flow rate to a value between 30 bed volumes per hour (BV/h) and 150 BV/h.

In at least some second non-limiting examples, an allowable pH range, comprising an upper bound and a lower bound, is specified around the target pH value, a proximity of the second pH value to at least one of the upper bound and the lower bound is determined, and the adjusting of the fluid flow rate is further based on the proximity.

In at least some third non-limiting examples, the allowable pH range is of +0.5 around the target pH value.

In at least some fourth non-limiting examples, a rate-of-change of the second pH value toward at least one of the upper bound and the lower bound is determined, and the adjusting of the fluid flow rate is further based on the rate-of-change.

In at least some fifth non-limiting examples, a rate-of-change of the pH difference is determined, and the adjusting of the fluid flow rate is further based on the rate-of-change.

In at least some sixth non-limiting examples, a capacity rate-of-change, indicative of changes in the deacidification capacity of the column, is determined, and the adjusting of the fluid flow rate is further based on the capacity rate-of-change.

In at least some seventh non-limiting examples, the fluid is a juice comprising at least one predetermined organic carboxylic acid.

In at least some eighth non-limiting examples, the target pH value is associated with a pKa value of said at least one organic carboxylic acid.

In at least some ninth non-limiting examples, the obtaining of the first and second pH values is performed substantially in real-time.

In at least some tenth non-limiting examples, a fluid flow path for the fluid is altered based on the pH difference between the second pH value and the target pH value.

In at least some eleventh non-limiting examples, a fluid flow path for the fluid is altered based on the deacidification capacity.

In at least some twelfth non-limiting examples, the adjusting of the fluid flow rate based on the pH difference comprises solving an equation comprising:

$$F_i = \frac{1}{pH_2 - pH_t}$$

where $F_i$ is the fluid flow rate, $pH_2$ is the second pH value and $pH_t$ is the target pH value.

In at least some thirteenth non-limiting examples, determining the deacidification capacity of the column comprises solving an equation comprising $$C_r = e^{-pH_2} - e^{-pH_1}$$

where $C_r$ is the deacidification capacity and $pH_{entry}$ is the first pH value.

In at least some fourteenth non-limiting examples, the adjusting of the fluid flow rate of the fluid through the column comprises ensuring that the second pH value does not exceed a predetermined maximum pH value.

Various aspects of the methods, systems, and computer-readable media described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of controlling a deacidification process for an aqueous fluid circulated through a deacidification column containing an ion exchange resin, comprising:
   obtaining, from a first sensor located at an entry of the column, first pH values indicative of a pH of the fluid before circulation through the column;
   obtaining, from a second sensor located at an exit of the column, second pH values indicative of a pH of the fluid after circulation through the column;
   comparing the second pH values to a target pH value for the fluid to determine a pH difference between the second pH values and the target pH value;
   determining, based on the first and second pH values, a remaining deacidification capacity of the ion exchange resin; and
   adjusting a fluid flow rate of the fluid through the column based on the pH difference and the remaining deacidification capacity.

2. The method of claim 1, wherein adjusting the fluid flow rate of the fluid comprises adjusting the fluid flow rate to a value between 30 bed volumes per hour (BV/h) and 150 BV/h.

3. The method of claim 1, wherein an allowable pH range, comprising an upper bound and a lower bound, is specified around the target pH value, the method further comprising determining a proximity of the second pH values to at least one of the upper bound and the lower bound, and wherein the adjusting of the fluid flow rate is further based on the proximity.

4. The method of claim 3, further comprising determining a rate-of-change of the second pH values toward at least one of the upper bound and the lower bound, and wherein the adjusting of the fluid flow rate is further based on the rate-of-change.

5. The method of claim 4, further comprising
determining, based on the rate-of-change of the second pH values, at least one future value for the second pH values; and
pre-emptively adjusting the fluid flow rate based on the at least one future value.

6. The method of claim 1, further comprising determining a rate-of-change of the pH difference, wherein the adjusting of the fluid flow rate is further based on the rate-of-change.

7. The method of claim 1, further comprising determining a capacity rate-of-change, indicative of changes in the remaining deacidification capacity of the ion exchange resin, wherein the adjusting of the fluid flow rate is further based on the capacity rate-of-change.

8. The method of claim 1, wherein the fluid is a juice comprising at least one predetermined organic carboxylic acid.

9. The method of claim 8, wherein the target pH value is associated with a $pK_a$ value of said at least one organic carboxylic acid.

10. The method of claim 1, wherein the adjusting of the fluid flow rate based on the pH difference comprises solving an equation comprising:

$$F_i = \frac{1}{pH_2 - pH_t}$$

where $F_i$ is the fluid flow rate, $pH_2$ is one of the second pH values and $pH_t$ is the target pH value.

11. The method of claim 1, wherein the adjusting of the fluid flow rate of the fluid through the column comprises ensuring that the second pH values do not exceed a predetermined maximum pH value.

12. A system for controlling a deacidification process for an aqueous fluid circulated through a deacidification column containing an ion exchange resin, comprising:
a flow control in fluid communication with the column and configured for adjusting fluid flow rate of the fluid through the column;
a first sensor located at an entry to the column, the first sensor configured for obtaining first pH values indicative of a pH of the fluid before circulation through the column;
a second sensor located at an exit of the column, the second sensor configured for obtaining second pH values indicative of a pH of the fluid after circulation through the column; and
a controller communicatively coupled to the first and second sensor for receiving therefrom the first and second pH values, the controller configured for:
comparing the second pH values to a target pH value for the fluid to determine a pH difference between the second pH values and the target pH value;
determining, based on the first and second pH values, a remaining deacidification capacity of the ion exchange resin;
adjusting, via the flow control, the fluid flow rate of the fluid through the column based on the pH difference and the remaining deacidification capacity.

13. The system of claim 12, wherein the fluid is a juice comprising at least one predetermined organic carboxylic acid.

* * * * *